United States Patent [19]

Marion et al.

[11] 4,001,126

[45] Jan. 4, 1977

[54] HEAT PROTECTIVE MATERIAL AND METHOD OF MAKING THE MATERIAL

[75] Inventors: Frank A. Marion; Hugh J. McSpadden, both of Riverside, Calif.

[73] Assignee: Universal Propulsion Co., Riverside, Calif.

[22] Filed: Jan. 21, 1974

[21] Appl. No.: 434,960

Related U.S. Application Data

[63] Continuation of Ser. No. 253,971, May 17, 1972, abandoned, which is a continuation of Ser. No. 4,157, Jan. 19, 1970, abandoned, which is a continuation-in-part of Ser. No. 766,066, Nov. 15, 1968, abandoned.

[52] U.S. Cl. .................... 252/62; 102/103; 102/105; 252/8.1; 252/188.3 R; 260/2.5 M; 260/2.5 FP; 260/37 EP; 260/830 S; 428/323; 428/330; 428/419; 428/921

[51] Int. Cl.² ........................................ C04B 43/00

[58] Field of Search .............. 252/62, 8.1, 188.3 R; 161/187, 184, 186, 188, 191, 162, 403; 260/37 R, 37 EP, 2.5 M, 2.5 FP, 830 S; 102/103, 105; 428/413, 416, 539, 418–420, 920, 921, 323, 330

[56] References Cited

UNITED STATES PATENTS

| | | | |
|---|---|---|---|
| 2,452,054 | 10/1948 | Jones et al. | 260/17.3 |
| 2,912,392 | 11/1959 | Stilbert et al. | 260/17.4 |
| 3,114,840 | 12/1963 | Johnston | 250/108 |
| 3,124,542 | 3/1964 | Kohn | 260/2.5 M |
| 3,457,215 | 7/1969 | Sommer | 260/37 R |
| 3,472,812 | 10/1969 | Byrne et al. | 260/41.5 |
| 3,539,474 | 11/1970 | Sommer | 260/2.5 |

*Primary Examiner*—Harold Ansher
*Attorney, Agent, or Firm*—Ellsworth R. Roston

[57] ABSTRACT

This invention relates to materials having properties of withstanding temperatures in the thousands of degrees for extended periods of time without gross decomposition. The invention also relates to methods of producing such materials.

The materials constituting this invention include binders and fillers mixed with the binders. The materials form a char when subjected to the elevated temperatures. The surface of the char glows in the luminous to incandescent range and rejects incoming heat by thermal radiation. The fillers have the properties of decomposing through a number of successive steps, each step advanced in temperature from the previous step by a relatively small amount. The gaseous products of such successive decompositions flow through the char, which is porous so as to provide transpirational heating. The resultant gases produced at the surface of the material provide a gaseous barrier to absorb heat and to transport heat away from the surface of the material.

4 Claims, 11 Drawing Figures

INVENTORS:
Frank A. Marion
Hugh J. McSpadden

ATTORNEYS

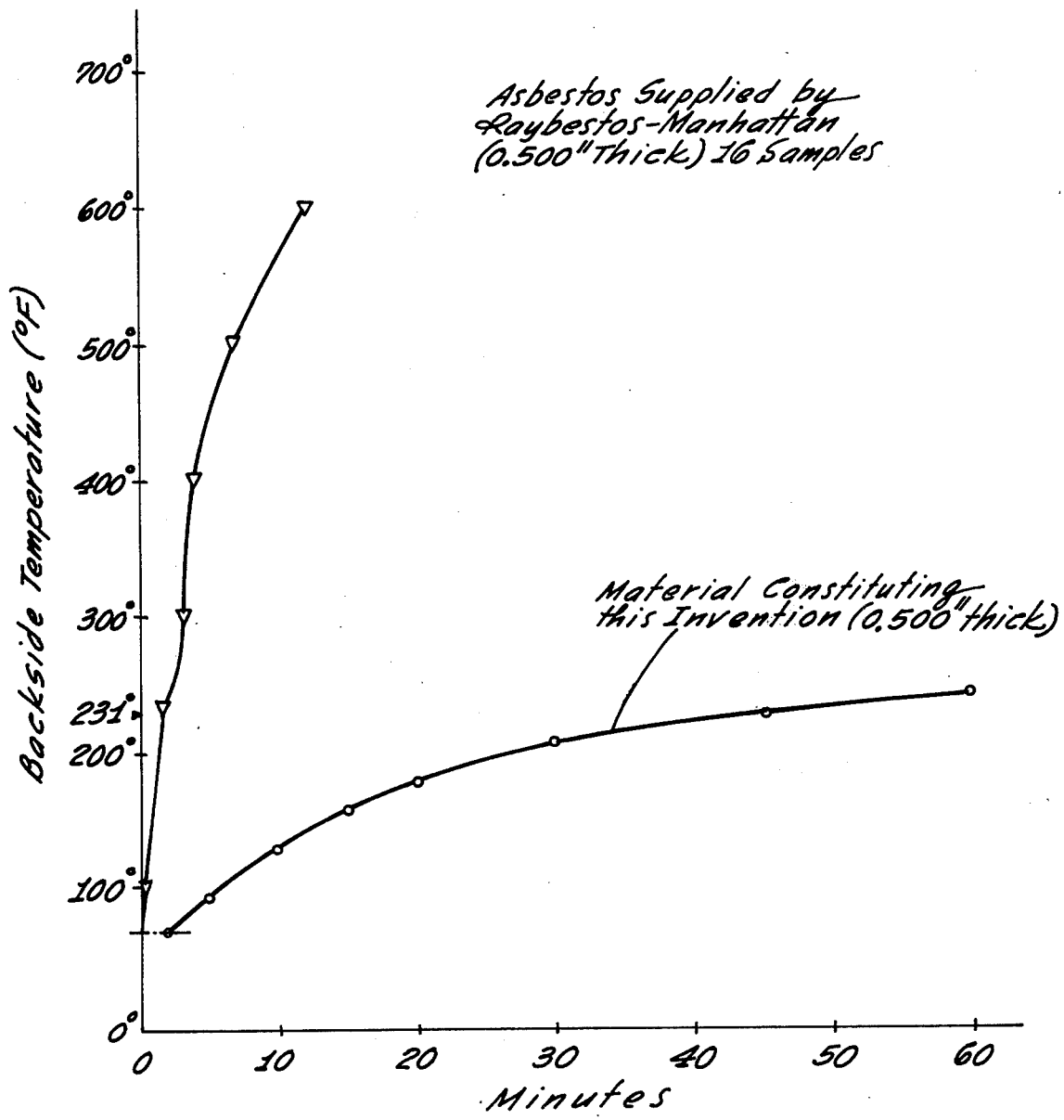

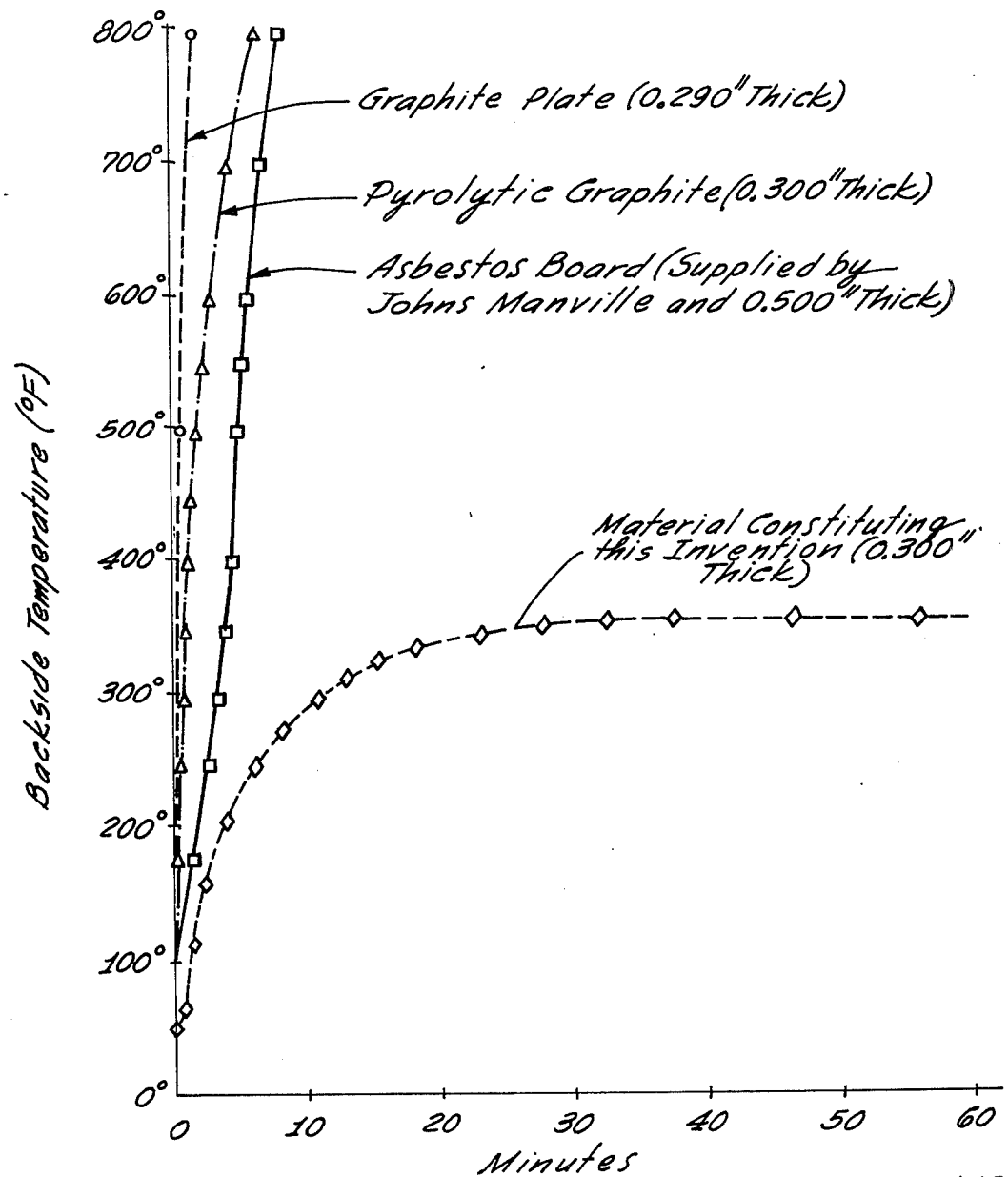

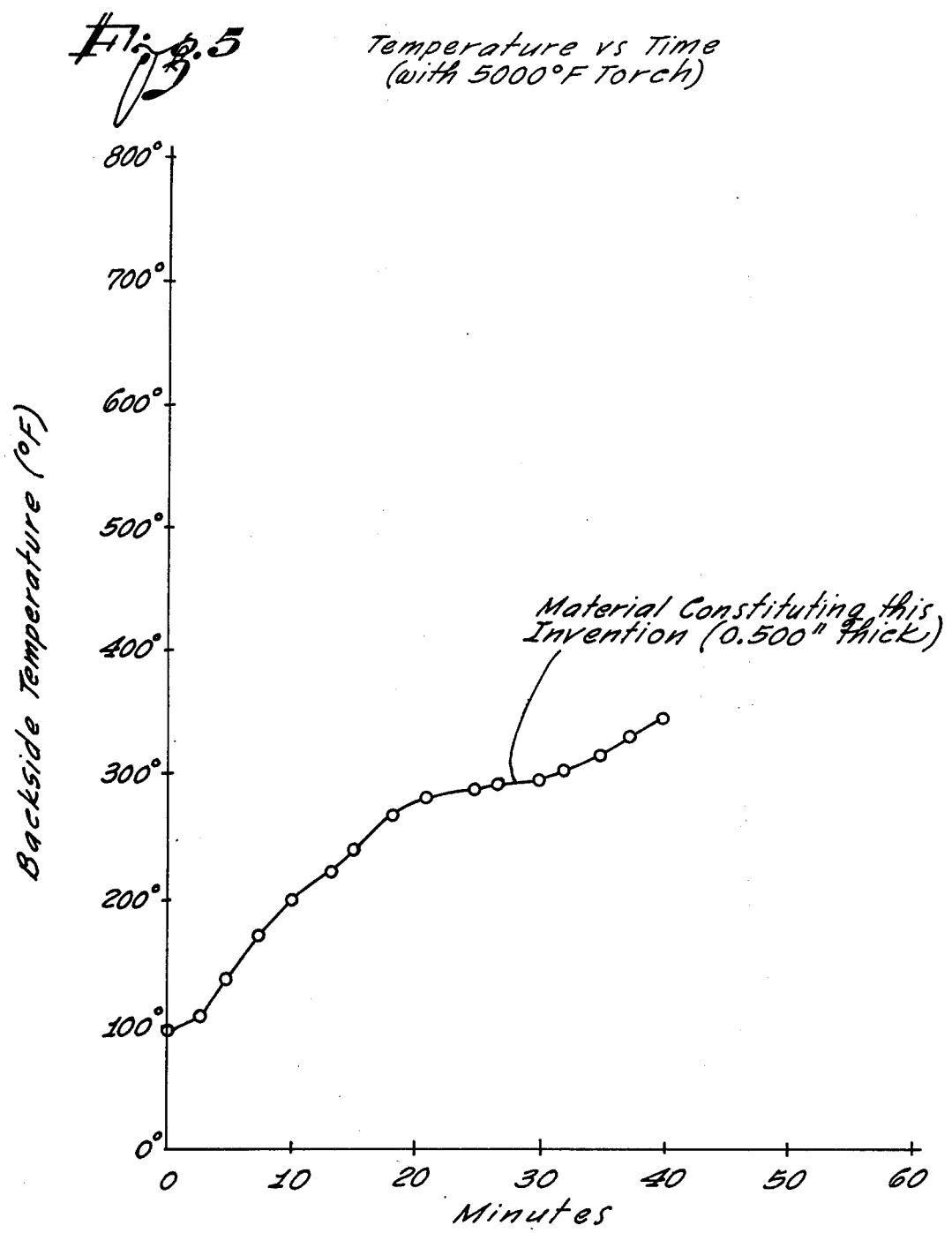

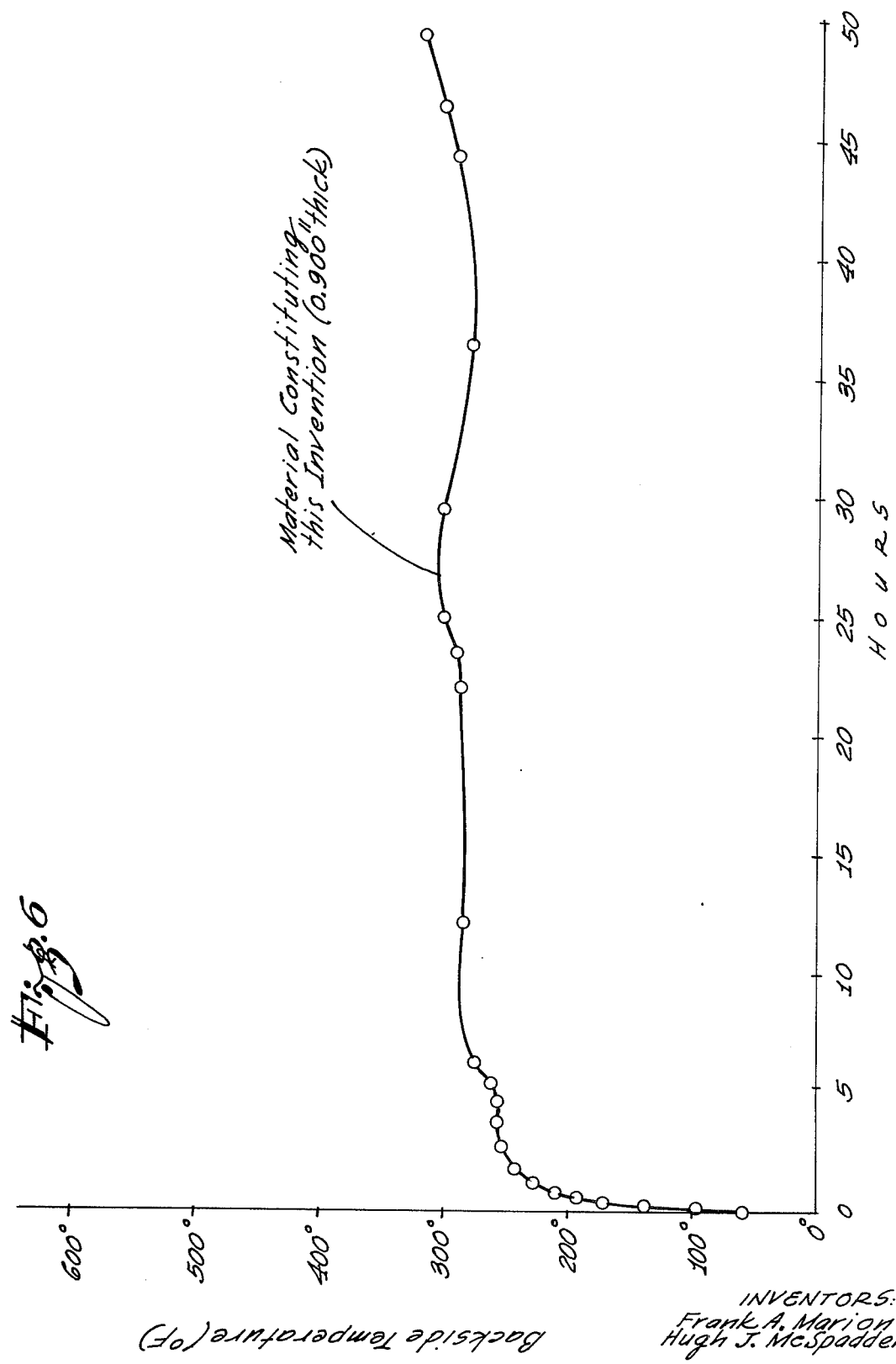

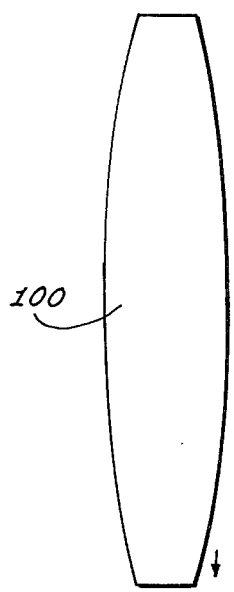
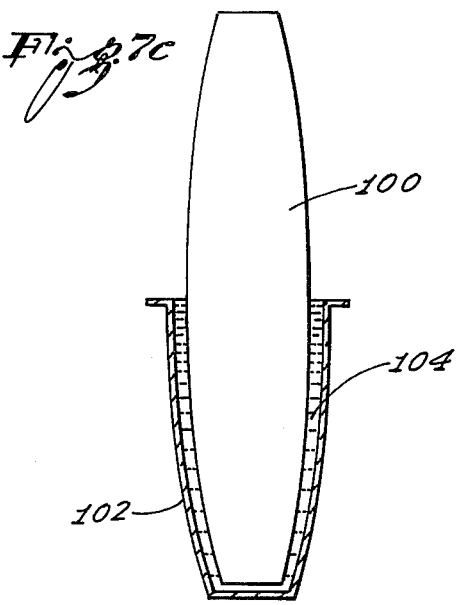
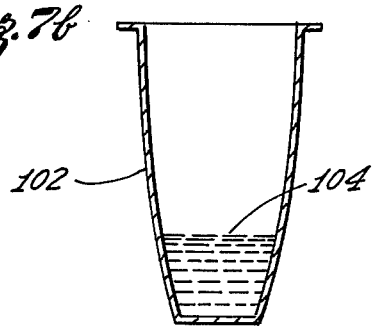
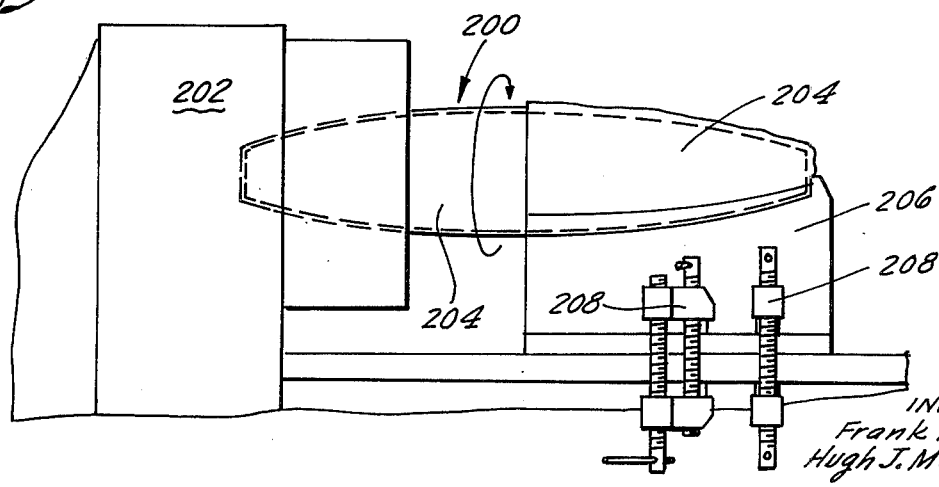

1

HEAT PROTECTIVE MATERIAL AND METHOD OF MAKING THE MATERIAL

This is a continuation of application Ser. No. 253,971, filed May 17, 1972, now abandoned, which in turn was a continuation of application Ser. No. 4,157, filed Jan. 19, 1970, now abandoned, which in turn was a continuation-in-part of application Ser. No. 766,066, filed Nov. 15, 1968, now abandoned, and entitled — "Heat Protective Material and Method of Making the Material".

This invention relates to a material having properties of providing heat insulation by withstanding elevated temperatures in the thousands of degrees for extended periods of time in the tens of hours without gross destruction. The invention also relates to methods of producing such a material.

It is becoming increasingly important in a wide number of different applications to provide a material which is capable of withstanding elevated temperatures in the thousands of degrees for extended periods of time in the tens of hours. For example, when missiles and space capsules move through the atmosphere and upper atmosphere, they are subjected to severe aerodynamic heating and aerodynamic shear loads which cause the skin of the missiles and space capsules to receive temperatures in the thousands of degrees in relatively short periods of time. As another example, pressurized gases flowing through ducts and venturi sections at high velocities cause relatively high temperatures to be produced on the surfaces of such ducts and venturi sections. Actually, the need for providing heat insulation at elevated temperatures in the thousands of degrees for extended periods of time is increasing rapidly.

Various attempts have been made in the past to provide materials which are capable of withstanding elevated temperatures in the thousands of degrees for extended periods of time, but such attempts have not been very successful. For example, asbestos has been provided as a heat insulating material. However, when subjected to a temperature in the order of 3000° F. as from the concentrated flame of an air-acetylene torch, a layer of asbestos ½ inch thick will have a temperature in a few minutes of approximately 600° F. at the surface removed from the air-acetylene torch. Furthermore, many of the heat-insulating materials developed thus far have not been able to be bonded to various backing members such as metals and have not been able to retain any bond when subjected to elevated temperatures for extended periods of time. Many of the heat-insulating materials also tend to crack and to lose any strength in relatively short periods of time.

This invention provides a material which overcomes the above disadvantages. For example, a coating of the material was applied in a thickness of approximately 0.6 inch to a steel plate having a thickness in the order of 0.050 inch and dimensions in the order of 6 × 6 inches. The flame from an air-acetylene torch was applied to the surface of the coating to provide a temperature of approximately 3000° F. and a heat transfer of approximately 60 BTU/square foot/second. At the end of approximately one hour, the temperature of the steel plate was approximately only 200° F. and at the end of approximately 30 hours the temperature of the steel plate was approximately only 350° F. The material can be bonded to any desired backing member by application in liquid, plastic or solid form of any desired thickness. The material can be applied and cured at ambient temperatures between approximately +50° F. and +125° F. The material has the properties of retaining its properties even after prolonged exposure to ambient temperatures and even when exposed to various solvents such as water, oil, gasoline and toluene. The material has properties of retaining its strength and/or retaining its bond to the backing member even when subjected to intense heat in the thousands of degrees for extended periods of time. The material constituting this invention can be used as an adhesive because it becomes bonded to other materials when cured and because it expands, when curing, to fill cracks and pores.

In the drawings:

FIGS. 3, 4 and 5 illustrate the response of temperature vs. time of materials constituting this invention and materials of the prior art when flames of relatively high temperature are continuously applied to the materials for periods of time in the order of 60 minutes;

FIG. 6 illustrates the response of temperature vs. time of materials constituting this invention when flames of relatively high temperature are continuously applied to the materials for periods of time in the order of 50 hours;

FIGS. 7a, 7b and 7c illustrate a method of molding the material constituting this invention on an item to be coated; and FIG. 8 illustrated a method of screeding the material constituting this invention on an item to be coated.

Figure 1:
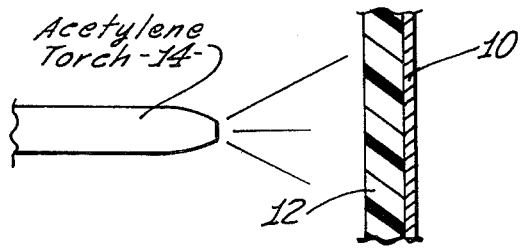
FIG. 1 is a sectional view illustrating the material constituting this invention when applied to a member to be insulated.

FIG. 1 illustrates one embodiment of the invention. It includes a member such as a steel plate 10 which is to be insulated from heat. The material constituting this invention is illustrated as a sheet or layer 12 bonded to the steel plate 10. The application of heat to the insulating sheet 12 is illustrated schematically by an acetylene torch 14.

The material constituting this invention constitutes a binder and filler material in the binder. The binder may be formed from a mixture of a polysulfide and an epoxide in a ratio in the order of 9 parts to 1 part by weight of polysulfide to from 1 part to 9 parts by weight of epoxide, and preferably from 1 to 4 parts of polysulfide to from 4 to 1 parts by weight of epoxide. A particularly preferred range is 70 parts to 30 parts by weight of polysulfide to 30 parts to 70 parts by weight of epoxide. Typically the two may be approximately equal in weight, or the epoxide may have a percentage by weight in the order of 40 parts to 45 parts per 100 parts of binder and the polysulfide may comprise the balance of the binder. An especially preferred amount is 57.5% by weight of polysulfide and 42.5% by weight of epoxide. The ratio is dependent upon the properties desired for the binder. For example, the epoxide tends to be brittle and glass-like with high tensile strength and low elongation and is subject to shock. The polysulfide tends to provide a high elongation and low tensile strength. It is flexible and rubbery and neither glass-like nor plastic. Variations in the ratios of the polysulfide and the epoxide will affect the physical and structural properties of the cured binder matrix and the rate of cure.

The polysulfides, sometimes termed polyalkylene polysulfide prepolymers, are mercapto-terminated polymers of the general formula

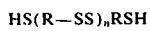

where R is a polyvalent organic radical containing at least one methylene group and $n$ is an integer of from about 3 to 100, and preferably from about 3 to 25. Preferred polysulfides include those in which R is

The polysulfides may be prepared by condensation of an alkali metal polysulfide, e.g. sodium polysulfide, with an organic dihalide such as dichlorodiethyl formal, ethylene dichloride, or dichloroethyl ether, as described in Industrial and Engineering Chemistry, Volume 43, pp. 324–8 (1951). Small proportions, e.g. 0.5–2% of trichloropropane or other polyhalides are often included with the dihalide. The polysulfides range in property from mobile to viscous liquids to solids at room temperature, depending on molecular weight. Those of liquid form are ordinarily preferred.

The epoxides, also referred to as glycidyl polyether resins, are epoxy-terminated polymers of the general formula

where R' is the divalent organic radical of a dihydric alcohol or a dihydric phenol and $n$ usually has a value of from about 1 to 20. Preferred epoxides include those in which R' is

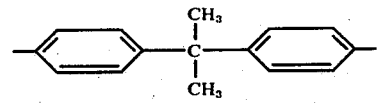

The epoxides may be prepared by condensation of epichlorhydrin in alkaline medium with a dihydric alcohol or a dihydric phenol such as Bisphenol A. The epoxides range in property from viscous liquids to low melting solids, depending on molecular weight or degree of condensation. The degree of condensation is indicated by the epoxide equivalent, defined as the grams of resin per one gram equivalent of epoxy. Epoxides are prepared with epoxide equivalents ranging from about 140 to 4000, but those of about 185 to about 300 are usually preferred since these are in liquid form at room temperature.

The filler may constitute a mixture of a phosphate and a borate, suitably in the form of ammonium and/or sodium salts. Preferably the filler may constitute a mixture of monobasic ammonium phosphate ($NH_4H_2PO_4$) or dibasic ammonium phosphate ($(NH_4)_2HPO_4$ and anhydrous sodium borate ($Na_2B_4O_7$). It will be appreciated, however, that the two fillers may be monobasic or dibasic sodium phosphate and anhydrous ammonium borate without materially affecting the advantages of the resultant material. The phosphate may constitute about 10 parts to 155 parts by weight and the borate may constitute about 10 parts to 110 parts by weight, per 100 parts of binder. Preferably, the phosphate comprises about 10 to 80 parts by weight and the borate comprises about 25 to 80 parts by weight, per 100 parts of binder. Typically the anhydrous sodium borate may comprise 55 parts by weight and the monobasic ammonium phosphate may comprise 45 parts by weight. The filler may constitute in the order of 50 parts to 300 parts by weight relative to 100 parts by weight of the binder. Preferably the filler constitutes approximately 65 to 90 parts by weight to 100 parts by weight of the binder.

The material constituting this invention may be formed from two separate mixtures which are stored separately, preferably in liquid form, until the material is desired to be formed. One of the mixtures constitutes the polysulfide and proportional share of the fillers, which may for example be fine powders of approximately 200 mesh. Actually, a greater proportion of the fillers can be added to the polysulfide than the proportion in the total mixture since the polysulfide is often less viscous than the epoxide. The first mixture can be stored for an indefinite period of time at ambient temperatures without losing its effectiveness.

In the curing of the compositions of this invention, the polysulfide component is capable of condensation with the epoxide component to effect cross-linking by interaction between the mercapto group and the epoxy group. This interaction is promoted by inclusion of a curative or accelerator. Appropriate accelerators are the aliphatic and aromatic primary, secondary and tertiary amines, generally employed at levels up to about 15 parts per 100 parts epoxide. Preferred polyfunctional amine curatives include 2,4,6-tri(dimethylaminomethyl)phenol, diethylenetriamine, and dimethylaminopropylamine. Other suitable amine curatives include dimethylaminomethyl phenol and benzyldimethylamine.

A curative for the epoxide is included in the first mixture. This curative is preferably a polyamine in order of approximately 8 to 12% by weight of the epoxide. However, the range of polyamines may range between approximately 0 to 25% by weight of the epoxide. Typically the polyamines have represented about 10% by weight of the epoxide. However, polyamides and/or acid anhydrides may be also used. The polyamines and polyamides can be used together as curatives but the acid anhydrides have to be used alone. When polyamides are used as the curative, their weight can range between 25 to 200% by weight of the epoxide. A typical level would be 50% by weight of the epoxide.

Preferred polyamide curatives are the reaction products of polymeric fatty acids with polyamines. The polymeric fatty acids may, for example, be dimerized and trimerized unsaturated fatty acids derived from drying oils such as soybean oil, linseed oil, tung oil and the like. The polyamines employed for the preparation of polyamide curatives include ethylenediamine, diethylenetriamine and the like.

The second mixture constitutes the epoxide and a proportionate share of the fillers, which may be fine powders of approximately 200 mesh. The second mixture is also in liquid form and can be stored for an indefinite period of time at ambient temperatures without losing its effectiveness. When it is desired to produce the cured material constituting this invention, the first and second mixtures are mixed at ambient temperatures in the desired proportions and the resultant material is allowed to set. After a short period, e.g. overnight, the resultant material is relatively solid and has developed approximately 70 to 90% of its ultimate strength. The material can be used in most applications even after this relatively brief period of time. Preferably, however, the resultant material is allowed to set for an extended period of time in the order of a week before it is used.

Although the combined first and second mixtures are preferably cured at room temperatures, they may be cured at temperatures up to 180° or 190° F. The combined first and second mixtures are preferably cured at room temperatures since this simplifies the procedure of forming the resultant material. When the combined first and second mixtures are cured at elevated temperatures, the curing process tends to become accelerated. However, when an acid anhydride is used as the curative, the resultant mixture is preferably cured at elevated temperatures in the order of 250° to 350° F.

A plasticizer such as dibutyl pthalate or tricresyl phosphate may be included in either one or both of the mixtures. The range of this plasticizer is 0 parts to 25 parts by weight of the plasticizer to approximately 100 parts by weight of the binder. Preferably the plasticizer may comprise 0 parts to 10 parts by weight to approximately 100 parts by weight of the binder. Typically the plasticizer constitutes 0 parts by weight in the binder. The plasticizer is not particularly advantageous since it tends to boil from the resultant product and make the product burn.

The binder used in the thermally protective material has certain important advantages. When subjected to heat at high temperatures in the thousands of degrees Fahrenheit, it forms a char structure at the surface receiving the heat and at progressive positions inwardly from the surface. This char structure is characterized by the formation of carbonaceous skeletons of hydrocarbons and is further characterized by the formation of carbon approaching a graphite structure having pyrolytic properties. A pyrolytic structure is desirable since it tends to provide for a lateral transfer of heat through the structure so that the transfer of heat through the material from the surface receiving the heat to the opposite surface is minimized. The pyrolytic char structure is characterized by a pyrolysis of hydrocarbons in a deficiency of oxygen to form carbon-carbon chains.

The char formed from the binder included in this invention is one type of a rigid cellular material created by pyrolysis. It is desirable in the thermally-protective material for a number of reasons. One reason is that the char is porous so that it is able to provide transpirational cooling by the passage of gases through the material and the escape of the gases from the material. The transpirational cooling is provided because the gases absorb heat from the structure as they pass through the structure. However, the char is not excessively porous since it would otherwise allow the gas to move explosively through the char and disrupt and weaken the char. Another reason is that the char constitutes a black body and is accordingly able to reflect and radiate from the surface of the char a substantial portion of the heat directed toward the surface. Further advantages of the char are that it is hard and does not crack easily. If the char would crack easily, it would lose its properties of providing thermal insulation.

The formation of the char is obtained primarily from the pyrolysis of the benzene ring provided by the epoxide. The pyrolysis of the polysulfide yields simple compounds which tend to break down and become gaseous. Because of this, it is desirable to have a considerable amount of the epoxide in the binder. However, it is not desirable to reduce the amount of the polysulfide excessively because the polysulfide contributes elasticity to the heat-protective material.

When the fillers are subjected to heat, they undergo a series of chemical reactions each having endothermal characteristics to absorb heat and each occurring at a relatively small temperature increment above the previous chemical reactions. For example, when anhydrous sodium borate and monobasic ammonium phosphate are used as the filler materials, the monobasic ammonium phosphate is decomposed chemically through several succesive steps to form metaphosphoric acid ($HPO_3$), ammonia and water. The water then causes the anhydrous sodium borate to become converted to a hydrate form of sodium borate. This hydrate form then becomes progressively decomposed through several successive chemical steps to boric oxide, sodium hydroxide and water. The chemical reactions are regenerative since the water formed from the decomposition of the monobasic ammonium phosphate tends to convert the anhydrous sodium borate to a hydrate form of sodium borate.

The chemical decomposition of the monobasic ammonium phosphate occurs initially at a temperature of approximately 100° C. It occurs at the positions where the binder is being converted to a char. The chemical decomposition is as follows:

$$2NH_4H_2PO_4 \rightarrow 2H_3PO_4 + 2NH_3 \tag{1}$$

The ammonia gas then escapes through the char structure which is produced from the binder. The decomposition of the monobasic ammonium phosphate as indicated in equation (1) causes approximately 59 kilocalories of heat per mole to be absorbed since the decomposition is endothermic. Furthermore, the ammonia absorbs heat from the char structure as it moves through the char.

The phosphoric acid produced as in equation (1) then becomes decomposed at a temperature of approximately 225° C. as indicated in the following chemical equation:

$$2H_3PO_4 \rightarrow H_4P_2O_7 + H_2O \tag{2}$$

This reaction is also endothermic and causes approximately 16.6 kilocalories of heat per mole to be absorbed. The water produced from this reaction tends to be absorbed by the anhydrous sodium borate to produce a hydrate form of sodium borate.

The tetraphosphoric acid ($H_4P_2O_7$) produced from the reaction of equation (2) further decomposes at a temperature of approximately 290° C. to produce metaphosphoric acid and water. This is expressed chemically as follows:

$$H_4P_2O_7 \rightarrow 2HPO_3 + H_2O \tag{3}$$

This decomposition is also endothermic and causes approximately 23.8 kilocalories of heat per mole to be absorbed. The metaphosphoric acid is a vitreous compound which sublimes at a temperature above approximately 900° C. However, the metaphosphoric acid does not sublime until all of the chemical reactions indicated above and below have taken place since all of these chemical reactions occur at temperatures considerably below 900° C. Until is sublimes, the metaphosphoric acid serves as a binder in the thermally-protective material constituting this invention. The subliming action occurs on an endothermal basis so that further heat is absorbed.

The molecules of water produced in equation (1) and (3) are combined with the anhydrous sodium tetraborate in the following chemical reaction:

$$Na_2B_4O_7 + 2H_2O \rightarrow Na_2B_4O_7 \cdot 2H_2O \qquad (4)$$

This reaction is desirable because the anhydrous sodium borate melts at a temperature of approximately 741° C. and does not decompose chemically at any temperature below 741° C. However, the hydrate form of the sodium borate decomposes at a temperature of approximately 100° C. as indicated below:

$$Na_2B_4O_7 \cdot 2H_2O \rightarrow 4HBO_2 + Na_2O \qquad (5)$$

This decomposition occurs on an endothermic basis with an absorption of approximately 99.4 kilocalories of heat per mole.

The chemical product $HBO_2$ further decomposes at a temperature of approximately 167° C. in the following chemical reaction:

$$4HBO_2 \rightarrow H_2B_4O_7 + H_2O \qquad (6)$$

This decomposition is also on an endothermic basis. The sodium oxide produced from equation (5) and the water molecules produced from equation (6) then combine to produce sodium hydroxide as indicated below:

$$Na_2O + H_2O \rightarrow 2NaOH \qquad (7)$$

Sodium hydroxide has a melting temperature of approximately 318° C. and a boiling point of approximately 1390° C. When the sodium hydroxide melts and boils, it absorbs heat. The boiling of the sodium hydroxide may be seen by the yellow flame at the surface of the char.

The boric acid in turn decomposes to produce boric oxide as indicated below:

$$H_2B_4O_7 \rightarrow 2B_2O_3 + H_2O \qquad (8)$$

This decomposition occurs at a temperature of approximately 276° C. on an endothermal basis. The boric oxide is a glass which is compatible with the carbon structure constituting the char and which has a melting temperature of approximately 577° C. and a boiling temperature of approximately 1500° C. When tested at flame temperature of 1800° F. very little molten glass was evident on the surface of the char. However, the molten glass was quite evident when the material was tested at temperatures approaching 3000° F. but the molten glass was retained by the carbonaceous char structure. In the flame of an oxygen-acetylene torch at approximately 4500° F., a small portion of the boric oxide did melt and flow but a substantial portion was vaporized.

The water produced from the chemical reaction indicated as equation (8) is combined with the anhydrous sodium borate to produce a hydrate form of the sodium borate. This facilitates the decomposition of the sodium borate as discussed above until the sodium tetraborate becomes a decahydrate having the formula $Na_2B_4O_7 \cdot 10H_2O$. Any excess water is absorbed to form sodium hydroxide after the quantity required to catalyze the decomposition process has been provided.

There are certain advantages to the sequence of chemical reations discussed above. One advantage is that one of the filler materials, the anhydrous sodium tetraborate, is more stable than all of the decomposition products except for the metaphosphoric acid finally produced from the decomposition of the monobasic ammonium phosphate. Another advantage is that a number of chemical reactions occur between a temperature of approximately 100° C. (equations 1 and 5) and a temperature of 290° C. (equation 3). The greatest temperature increment occurs between 100° and 167° C. (equations 5 and 6) and the smallest temperature increment occurs between 276° and 290° C. (equations 3 and 8).

Figure 2A:
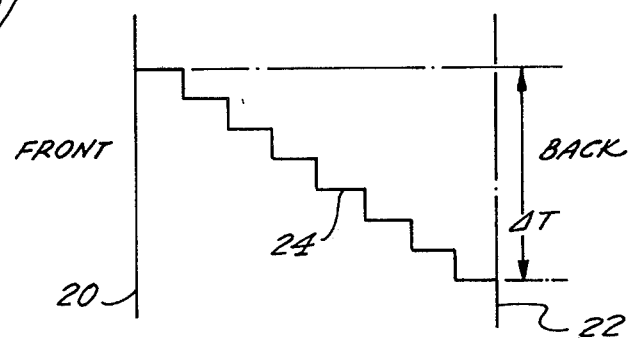
FIG. 2a is a view illustrating the temperature increments in the material constituting this invention.
Figure 2B:
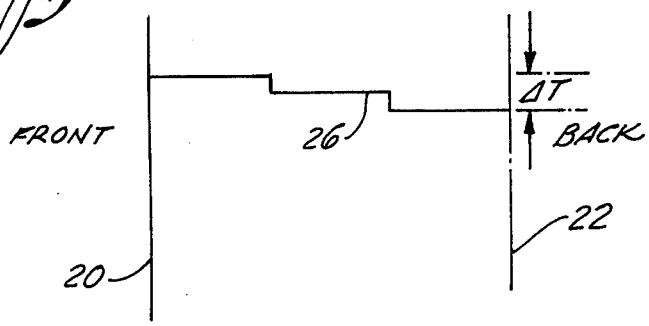
FIG. 2b is a view illustrating the temperature increments in the materials of the prior art.

By providing a sequence of chemical reactions and chemical decompositions at progressive temperature increments of relatively small value, the passage of heat through the material from the surface receiving the heat to the opposite surface is minimized. This may be seen from FIGS. 2a and 2b. In FIG. 2a, the surface of the material receiving the heat is illustrated at 20 and the opposite surface is illustrated at 22. The temperatures between the surface 20 and 22 are illustrated schematically at 24 when a plurality of temperature increments of relatively low value are provided. Since the heat differential between adjacent positions is relatively low, relatively little heat is transferred between the surfaces 20 and 22. In contrast, the temperature increments are illustrated schematically at 26 when the increments are relatively large. Since the temperature increments are quite discrete, large transfers of heat occur in the areas between the successive temperature increments. Such large transfers of heat have occurred in the materials of the prior art.

The formation of the char from the binder tends to facilitate the chemical decomposition of the filler materials in its successive steps. The reason is that the char is porous so that the gases produced by the chemical reactions indicated above tend to move through the char toward the surface of the material receiving the heat. In particular, the movement of the water molecules through the char tends to facilitate the conversion of the anhydrous sodium tetraborate to the hydrate form of the sodium tetraborate on a regenerative basis. Furthermore, the porous nature of the char tends to facilitate transpirational cooling of the char since the gases absorb heat as they move through the char.

When the gases passing through the char reach the surface of the char, they tend to form a reflective surface in front of the surface of the thermally-protective material receiving the heat. The reflective surface formed by the gases tends to inhibit the passage of heat into the thermally-protective material. Furthermore, the gases tend to absorb additional heat after they form the reflective surface in front of the thermally-protectve surface receiving the heat. It will be appreciated that most of the gases produced by the chemical reactions and decompositions described above are noninflammable. Furthermore, the use of water on a regenerative basis to provide a hydrate form of the tetraborate and to convert sodium oxide to sodium hydroxide is beneficial in preventing deleterious reactions of water with carbon. Otherwise, carbon and water vapor would tend to rect rapidly at high temperature such as the red-hot surface of a material receiving heat. This reaction would tend to disrupt the surface of the material so that the material would tend to become weakened. Furthermore, it would cause different areas to become exposed so that further chemical reactions of the carbon and water vapor would tend to occur on a progressive basis. It would also tend to deprive the char of carbon molecules so as to weaken the char.

The char structure tends to be strengthened by the refractory compounds of the vitreous metaphosphoric acid ($HPO_3$) and glass-like boric oxide constituting the end products in the chemical reaction indicated above. These refractory compounds solidify to cement and reinforce the carbonaceous char structure.

The decomposition and sublimation products have been successfully formulated to provide a reducing atmosphere within and around the char structure. This may be seen in part from the fact that the char structure is not consumed until the substrate material has been completely depleted and ceases to produce the effluent gases and vapors.

It will be appreciated that other materials may be used than those discussed above. For example, borax ($Na_2B_4O_7 \cdot 10H_2O$) may be used in place of anhydrous sodium borate as one of the materials in the filler.

The range of the borax by weight may be 17 to 260 parts to approximately 100 parts by weight of binder. Preferably the borax has a range of 25 to 80 parts by weight to 100 parts by weight of binder. Typically the borax constitutes 55 parts by weight to 100 parts by weight of binder. When borax is used, the following decomposition occurs:

$$Na_2B_4O_7 \cdot 10H_2O + 4Na_2B_4O_7 \rightarrow 5Na_2B_4O_7 \cdot 2H_2O \quad (9)$$

The hydrate form of sodium tetraborate then decomposes in a manner indicated in equations (5) to (8) above. Borax is not an advantageous as the anhydrous sodium tetraborate since the ten moles of water per mole of the tetraborate tend to decompose at high rates when in the presence of carbon and form carbon monoxide and carbon dioxide. The formation of carbon monoxide and carbon dioxide tends to deprive the char of carbon and accordingly to weaken the char.

Other materials may also be used as the fillers within the scope of the invention. For example, ammonium biborate ($NH_4HB_4O_7 \cdot 3H_2O$), sodium hydrogen phosphate ($Na_2HPO_4$), sodium and calcium hydrogen phosphate ($CaH_4(PO_4)_2$) $\cdot H_2O$ may also be used. Preferably, the phosphates are substituted for the monobasic ammonium phosphate listed above in equation (1) so that this material can be involved in the series of reactions with the tetraborate where each reaction occurs at a relatively small increment of temperature above the previous reaction. Similarly the biborate is substituted for the borate listed above in equation (1). Other materials such as other borates may be substituted for the tetraborates specified above without departing from the scope of the invention. Furthermore, other metallic elements such as potassium, lithium, rubidium, cesium, barium, strontium, magnesium and calcium may be substituted for sodium in the tetraborate without departing from the scope of the invention.

When ammonium biborate is used it may have a range of 17 to 100 parts by weight to 100 parts of binder. Preferably the ammonium biborate has a range of 25 to 80 parts by weight to 100 parts by weight of binder. Typically the ammonium biborate has a weight of 55 parts to 100 parts by weight of binder.

In addition to the above, other materials may also be used in the filler. For example, titanium dioxide ($TiO_2$), calcium hydroxide ($Ca(OH)_2$), aluminum hydroxide ($Al(OH)_3$) and zirconium dioxide ($ZrO_2$) may be included in the filler. These fillers may be used singly or with other fillers. The hydroxides tend to lose their water molecules when subjected to heat so that the oxides of the metals are produced. The water molecules then tend to combine with the anhydrous form of the tetraborate for facilitating the chemical decomposition of the tetraborate. The oxides of the metals tend to be chemically inert so that they do not decompose to absorb heat. However, the oxides and hydroxides tend to contribute to the reflection and re-radiation of the heat from the surface of the heat-protective material. The oxides and hydroxides of the metal provide a relatively increased protection in the thermally-protective material against heat at a temperature of approximately 5000° F. than at a temperature of approximately 3000° F.

Other fillers may be used in the percentages indicated below per 100 parts by weight of binder:

| Material | Parts by Weight |
| --- | --- |
| Calcium phosphate, $CaH_4(PO_4)_2$ | 86 |
| Sodium phosphate, tribasic | 85 |
| Sodium phosphate, pyrophosphate | 85 |
| Sodium oxalate | 85 |
| Calcium oxalate | 37 |
| Ammonium bromide | 4 – 10.2 |
| Ammonium sulfate | 10 – 85 |
| Potassium carbonate | 85 |
| Sodium carbonate | 85 |
| Calcium sulfate | 85 |
| Aluminum hydroxide | 40 – 85 |
| Calcium hydroxide | 38.7 – 85 |
| Zirconium hydroxide | 85 |
| Titanium dioxide | 34 – 52.5 |
| Magnesium oxide | 17 |
| Aluminum oxide | 42.7 – 57.7 |
| Potassium chloride | 85 |
| Potassium bromide | 1 – 4 |
| Aluminum fluoride | 50.6 |
| Graphite | 34 |
| Eccospheres R.silica microballoons | 17 – 24 |
| Fumed Silica ($SiO_2$) Cab-O-Sil M5 | 3 – 11 |
| Mica | 35 |

In addition to the advantages described above, the heat-protective material has certain additional advantages. One advantage is that the material can be applied in liquid, plastic or solid form of any desired thickness to the member to be insulated. The heat protective material can be bonded to any practical surface to provide effective insulation between that surface and a source of heat. The material is capable of retaining this bond and its heat-insulating properties and its structural integrity at ambient temperatures between approximately 65° and 185° F. for extended periods of time, even when subjected continuously for prolonged periods of time to temperatures near the extremes of this range. The material is resistant to water, oil, gasoline and solvents such as toluene. However, the material does exhibit slight swelling when immersed in toluene for approximately 30 days and does experience somewhat more swelling when immersed in acetone for approximately 30 days.

The material retains its insulating properties when subjected to severe aerodynamic heating and high aerodynamic shear loads. It provides insulation of vessels that must withstand high temperatures and high pressures, insulation of ducts and venturi sections that must contain pressurized gases flowing at high velocities and insulation of structures subjected to high levels of radiant heating and to high temperature combustion products.

Other binder systems than a mixture of epoxides and polysulfides have been used with some success but these binders have not matched the success of the polysulfide-epoxide combination. These binders have included polyurethane, polybutadiene, polysulfide (alone), epoxides (alone), Furane resin, polyester resin, phenolic resin, silicone resins, 2-pyrol and linseed oil. When Furane resin is used as the binder, it may be used in the range of 10 parts by weight to 90 parts by weight of the resin with epoxy resin in the range of 90 parts to 10 parts by weight of the epoxy resin. However, some of these such as polyurethane do not char but tend to melt. Because of this, these materials are not completely advantageous. Rubber polymers such as polybutadienes may also be used, as may neoprene or butyl rubber of natural rubber. When these materials are used as the binder, the curing temperature may have to be raised.

Epoxides such as liquid epoxy resin may also be used alone as the binder. Under such circumstances, a polyfunctional amine or a polyamide in the stochiometric range of 50 to 200% may be used as the curative or a combination of the polyfunctional amine and the polyamide in the range of 1 parts to 9 parts of one curative to 9 parts to 1 part of the other curative may be used to provide a composite stochiometric range of 50 to 200%.

Binders formed from approximately 100 parts by weight of sodium silicate, 50 parts of calcium sulfate (plaster of Paris), 75 to 125 parts by weight of "Fixall" plaster repair, 100 parts by weight of asbestos, 100 parts by weight of interior plaster or 100 parts by weight of plastic cement may also be used. With such binders, fillers may be used in the ranges specified below for 100 parts by weight of the binders:

| Material | Range |
|---|---|
| Borax | 50 – 100 |
| Anhydrous sodium borate | 54 |
| Monobasic ammonium phosphate | 48 |
| Monobasic calcium phosphate | 50 – 100 |
| Aluminum hydroxide | 50 |
| Aluminum oxide | 100 |

When Furane resin, polyester resin, phenolic resin, silicone resin and 2-pyrol are used as the binders, the following fillers may be used in the ranges of parts by weight specified below for 100 parts by weight of binder:

| Material | Range |
|---|---|
| Oxalic acid | 100 – 175 |
| Borax | 55 – 60 |
| Anhydrous sodium borate | 54 |
| Monobasic ammonium phosphate | 40 – 48 |
| Fumaric acid | 67 – 150 |
| Dibasic ammonium phosphate | 45 – 55 |
| Paraformaldehyde | 75 – 100 |
| Ammonium silico fluoride | 150 |
| Eccospheres R | 50 |

The carbonaceous char structure may be impregnated with molten or solid glass formations such as the boron oxides or with vitreous compounds such as metaphosphoric acid or with highly deliquescent compounds such as sodium oxide or sodium hydroxide or with any combination of such compounds as provide the most suitable char structure for a particular high temperature insulating requirement. These materials may be mixed with the filler materials described above.

Various heat tests have been conducted on the material constituting this invention. For example, a sample of the preferred material of approximately 0.90 inches thickness was bonded to a 6 × 6 inch sheet of 4130 steel of approximately 0.050 inches thickness. The weight of this heat-protective sample was approximately 6 pounds per square foot. An air-acetylene torch was directed against the material for a continuous period of approximately 50 hours. During this period of 50 hours the maximum temperature on the back of the steel sheet was approximately 300° F. The heat flux from this torch was approximately 1,800,000 BTU per pound for the period of 50 hours of exposure. Even if 90% of this heat were reflected by the barrier formed by the black body and the gaseous barrier at the surface of the black body, approximately 100,000 BTU/lb would still be absorbed. Approximately 2% of the applied heat would be absorbed through thermal decomposition and sublimation of the various chemical compounds. This tends to prove that the low temperature differential thermal gradients tend to reduce the amount of heat transferred through the heat-protective material.

As illustrations of the heat advantages of the materials constituting this invention in comparison to materials of the prior art, FIGS. 3, 4 and 5 illustrate characteristics of temperature vs. time of the materials constituting this invention and materials of the prior art. In all of these Figures, the temperature on the back side of the material was measured at progressive periods of time when heat was applied to the front side of the material. In FIGS. 3 and 4, the flame from a air-acetylene torch was applied to the materials to provide a temperature of approximately 3,000 F. and in FIG. 5 the flame from an oxyacetylene torch was applied to the materials to provide a temperature of approximately 5,000° F.

The materials used in FIG. 3 to constitute this invention had the following composition:

| Material | Parts by Weight |
|---|---|
| Polysulfide (Thiokol LP-33) (a) | 55.0 |
| Curative (Rohm & Haas DMP-30) (b) | 4.5 |
| Ammonium biborate | 47.0 |
| Epoxide (Ciba Araldite 6020) (c) | 45.0 |
| Sodium phosphate monobasic | 34.4 |

(a) Liquid polysulfide resin having terminal mercaptan groups and a molecular weight of about 1000
(b) 2,4,6-tri(dimethylaminomethyl)phenol
(c) Epoxy equivalent 208 grams per gram mol of epoxide The materials tested in FIG. 3 had a thickness of approximately ½ inch.

The material used in FIG. 4 to constitute this invention had a thickness 0.3 inches. The material had the following composition:

| Material | Parts by Weight |
|---|---|
| Polysulfide (Thiokol LP-33) | 55.0 |
| Anhydrous sodium borate | 36.0 |
| Monobasic ammonium phosphate | 32.0 |

| Material | Parts by Weight |
| --- | --- |
| Curative (Rohm & Haas DMP-30) | 4.5 |
| Epoxide (Ciba Araldite 6020) | 45.0 |

In FIG. 5, the material used had a thickness of approximately 0.625 inches and had the following composition:

| Material | Parts by Weight |
| --- | --- |
| Polysulfide (Thiokol LP-33) | 57.5 |
| Curative (Rohm & Haas DMP-30) | 4.25 |
| Anhydrous sodium borate | 18.0 |
| Monobasic ammonium phosphate | 16.0 |
| Aluminum oxide | 40.0 |
| Epoxide (Ciba Araldite 6020) | 42.5 |

FIG. 6 illustrates the response of the material constituting this invention to a flame of approximately 3000° F. continuously over an extended period of time such as approximately 50 hours. The material used in this test had the following composition:

| Material | Parts by Weight |
| --- | --- |
| Polysulfide (Thiokol LP-33) | 55.0 |
| Anhydrous sodium borate | 36.0 |
| Monobasic ammonium phosphate | 32.0 |
| Curative (Rohm & Haas DMP-30) | 4.5 |
| Epoxide (Ciba Araldite 6020) | 45.0 |

The coating formed from the above material had a thickness of approximately 0.9 inches. It was bonded to a steel plate having a thickness of approximately 0.05 inches. As will be seen from FIG. 6, the temperature at the back side of the steel plate was only approximately 300° F. after the application of the temperature of approximately 3000° F. continuously to the front of the coating for approximately 50 hours.

Additional formulations found to exhibit the advantages of the invention are:

| | Material | Parts by Weight |
| --- | --- | --- |
| A. | Polysulfide (a) | 55.0 |
| | Epoxide (c) | 45.0 |
| | Curative (b) | 1.5 |
| | Polyamide (d) | 30.0 |
| | Borax | 27.4 |
| | Ammonium Phosphate Monobasic | 57.6 |
| B. | Polysulfide (a) | 55.0 |
| | Epoxide (c) | 45.0 |
| | Curative (b) | 4.0 |
| | Ammonium Phosphate Monobasic | 29.6 |
| | Ammonium Biborate | 33.2 |
| | Silica microspheres | 19.2 |
| C. | Polysulfide (a) | 57.5 |
| | Epoxide (c) | 42.5 |
| | Curative (b) | 4.25 |
| | Sodium Borate anhydrous | 36.0 |
| | Ammonium Phosphate Monobasic | 32.0 |
| D. | Polysulfide (a) | 57.5 |
| | Epoxide (c) | 42.5 |
| | Curative (b) | 4.25 |
| | Ammonium Biborate | 67.5 |
| | Ammonium Phosphate Dibasic | 22.5 |
| E. | Polysulfide (a) | 57.5 |
| | Epoxide (c) | 42.5 |
| | Curative (b) | 4.3 |
| | Ammonium Biborate | 51.0 |
| | Ammonium Phosphate Dibasic | 17.0 |
| | Silica fibers, ¼ inch | 21.0 |
| F. | Polysulfide (a) | 57.5 |
| | Epoxide (c) | 42.5 |
| | Curative (b) | 4.3 |
| | Ammonium Biborate | 30.0 |
| | Ammonium Phosphate Dibasic | 10.0 |

| Material | Parts by Weight |
| --- | --- |
| Mica powder | 35.0 |

(d) Versamid 125, the reaction product of dimerized linoleic acid and polyamine

The materials constituting this invention can be applied by suitable techniques at room temperatures to an object such as the external parts including the cone of a rocket so as to have substantially uniform thicknesses on these parts. When the materials are applied to an object in a substantially uniform thickness, various additives can be applied to the material to thicken the material and to apply a distinctive color to the material. The thickness of the material is increased because of the very fine particle size of the color additives, such that the material will not run after it has been applied to the parts including the cone of the rocket.

One composition of a material to be applied to the rocket parts including the nose cone is indicated below:

| Material | Proportion by Weight |
| --- | --- |
| FIRST MIXTURE | |
| Polysulfide (Thiokol LP-33) | 57.50 |
| Curative (Rohm and Haas DMP-30) | 4.25 |
| Ammonium Biborate | 53.00 |
| Fumed Silica (Cab-O-Sil M5) | 3.50 |
| SECOND MIXTURE | |
| Ammonium Biborate | 14.50 |
| Epoxide (Ciba Araldite 6020) | 42.50 |
| Bibasic Ammonium Phosphate Powder | 22.50 |
| Fumed Silica (Cab-O-Sil M-5) | 3.50 |
| Hydrated Ferric Oxide (Pfizer Yellow-Y05087) | 1.80 |
| Ferric Oxide (Pfizer Red - R5098) | 0.16 |
| Carbon Black (Pfizer Black - Carbon Black) | 0.04 |
| Chromic Oxide (Pfizer Green - G7099) | 0.35 |

The first and second mixtures are processed in a manner similar to that described above immediately prior to the time that the material constituting this invention is to be used. By using the different coloring materials specified above, the material constituting this invention is provided with an olive drab color corresponding to color chip X-34087.

FIGS. 7a, 7b and 7c illustrate a method of molding the material constituting the invention on an item or object to be coated. The object 100 to be coated is placed in a mold 102 which constitutes a female counterpart of a portion of the item to be coated. The mold 102 is uniformly separated from the object 100 by a particular distance such as 0.150 inches.

The material 104 to be coated is disposed in the mold 102 in a measured quantity prior to the disposition of the object 100 in the mold. The object 100 is then inserted in the mold 102 in symmetrical relationship to the mold and the material is then cured. The coated object 100 is then removed from the mold and the upper half of the object 100 is coated in a similar manner.

FIG. 8 illustrates apparatus for applying the material constituting this invention to an object as by screeding. An object 200 is placed in a lathe 202 and is rotated at a substantially uniform speed. The material 204 to be coated is applied to the object 200 at a position above a screed or doctor blade 206 and in front of the screed in the direction of rotation of the object. The screed 206 is attached to the lathe 202 as by "C" clamps 208 so that it is fixedly positioned relative to the lathe. The screed 206 wipes excess material 204 from the object 200 so that the material 204 has a substantially uniform thickness on the object. The material 204 is cured after it has been applied in a substantially uniform thickness on the object 200 and after the object has been removed from the lathe.

When the coating is applied to the object as described above and as illustrated in FIGS. 7a, 7b, 7c and 8, it has certain important advantages. One advantage is that there is no spilling, dripping, spattering or sagging of the material while it is being applied to the object to be coated and after the object is cured. Furthermore, no voids or air bubbles are produced in the material while the material is being applied or cured and after it has been cured.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:
1. A method of producing a thermally protective material capable of providing heat insulation by withstanding elevated temperatures in the thousands of degrees for extended periods of time in the tens of hours without gross destruction including:

mixing an epoxide and a filler material to form a first mixture, the filler material having properties of being chemically non-reactive at normally encountered ambient temperatures and having properties of chemically reacting in successive steps at progressive increments of temperature above the normally ambient temperature to provide a plurality of chemical products each resulting from an endothermal chemical reaction of previous chemical products where each successive endothermic chemical reaction in the chain occurs at an elevated temperature of small increment relative to the previous endothermic chemical reaction in the chain, mixing a polysulfide and the filler materials and a curative for the epoxide to form a second mixture, and mixing the first and second mixtures to produce the thermally protective material, the epoxide having a range of 4 parts by weight to 1 part by weight of epoxide to 1 part to 4 parts by weight of polysulfide, the thermally protective material being initially non-porous and the thermally protective material providing transpirational cooling by the passage through a char of the gases produced from the filler materials, the thermally protective material having elastomeric properties to inhibit cracking of the thermally protective material during the formation of the char as a result of the subjection of the thermally protective material to the elevated temperatures, the binder being selected from a selected group consisting of mercapto-terminated polymers having the general formula HS(R—SS)$_n$RSH where R is a polyvalent organic radical containing at least one methylene group and $n$ is an integer of from about 3 to 100, and preferably from about 3 to 25 and the epoxy-terminated polymers having the general formula

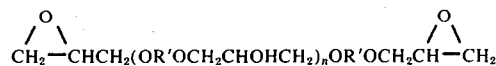

where R' is the divalent organic radical of a dihydric alcohol or a dihydric phenol and $n$ usually has a value of less than 1 to a value of about 20, the material selected for crosslinking the mercapto-terminated polymers and the epoxide-terminated polymers having a percentage by weight of approximately 15 parts to 100 parts by weight of epoxide-terminated polymers, the filler materials including phosphates and borates, the phosphates being selected from a group consisting of sodium and ammonium phosphate and the borates being selected from a group consisting of sodium and ammonium borate, the filler materials being uniformly dispersed in the binder in about 10 to 80 parts by weight of at least one of sodium or ammonium phosphate per 100 parts by weight of binder and from about 25 to 80 parts by weight of at least one of sodium or ammonium borate per 100 parts by weight of the binder.

2. A thermally protective material capable of providing heat insulation by withstanding elevated temperatures as high as thousands of degrees Fahrenheit for extended periods of time as long as tens of hours without gross destruction, consisting essentially of:

a binder having properties of forming a char when subjected to heat, and at least one filler material mixed with the binder and having properties of chemically reacting in successive steps to provide in sequence a plurality of chemical products each resulting from an endothermal chemical reaction of previous chemical products where each successive endothermic chemical reaction in the chain occurs at an elevated temperature of small increment relative to the previous endothermic chemical reaction in the chain, the filler material has properties of obtaining the production in the successive chemical reactions of gases which travel through the char to the surface of the thermally protective material to cooperate with the char in providing a surface reflective to the heat and wherein the filler materials have properties of obtaining the production in the successive chemical reactions of chemical products which decompose on an endothermal basis, the binder being selected from a group consisting of mercapto-terminated polymers and epoxy-terminated polymers, the mercapto-terminated polymers and epoxy-terminated polymers being cross-linked, the mercapto-terminated polymers having the general formula HS(R—SS)$_n$RSH where R is a polyvalent organic radical containing at least one methylene group and $n$ is an integer of from about 3 to 100, and preferably from about 3 to 25 and the epoxy-terminated polymers having the general formula

where R' is the divalent organic radical of a dihydric alcohol or a dihydric phenol and n usually has a value of less than 1 to a value of about 20, a material selected from a group consisting of the aliphatic and aromatic primary, secondary and tertiary amines and having properties of serving as an agent for cross-linking the mercapto-terminated polymers and the epoxide-terminated polymers, the material selected for cross-linking the mercapto-terminated polymers and the epoxide-terminated polymers having a percentage by weight of approximately 15 parts to 100 parts by weight of the epoxide-terminated polymers, the filler materials being selected from a group consisting of phosphates and borates, the phosphates being selected from a group consisting of sodium and ammonium phosphate and the borates being selected from a group consisting of sodium and ammonium borate, the filler materials being uniformly dispersed in the binder in about 10 to 80 parts by weight of at least one of sodium or ammonium phosphate per 100 parts by weight of binder and from about 25 to 80 parts by weight of at least one of sodium or ammonium borate per 100 parts by weight of the binder.

3. A thermally protective material capable of providing heat insulation by withstanding elevated temperatures as high as thousands of degrees Fahrenheit for extended periods as long as tens of hours without gross destruction, consisting essentially of:

a binder having properties of forming a carbonaceous char when subjected to heat, the char having properties of resisting oxidation, of being a poor thermal conductor and of providing a porous pyrolytic black body at the surface for re-radiating heat from the surface and of conducting gases through the material, the binder including benzene rings to facilitate the formation of the char, and at least a pair of filler materials mixed in the binder and having properties of chemically reacting in successive steps on an endothermal basis to provide gases which travel through the porous char body to the surface of the char body for facilitating the reflection of heat from the surface and to further provide in sequence from the pair of filler materials a plurality of chemical products each resulting from an endothermal chemical reaction of previous chemical products and each having properties of providing a chemical reaction at a progressive increment of temperature, each temperature increment being of relatively low value, to form as a final product solids having properties of subliming at an elevated temperature on an endothermal basis, the binder being selected from a group consisting of mercapto-terminated polymers and epoxy-terminated polymers, the mercapto-terminated polymers having the general formula HS(R—SS)$_n$RSH where R is a polyvalent organic radical containing at least one methylene group and n is an integer of from about 3 to 100, and preferably from about 3 to 25 and the epoxy-terminated polymers having the general formula

where R' is the divalent organic radical of a dihydric alcohol or a dihydric phenol and n usually has a value of less than 1 to a value of about 20, a material selected from a group consisting of the aliphatic and aromatic primary, secondary and tertiary amines and having properties of cross-linking the mercapto-terminated polymers and the epoxide-terminated polymers, the material selected for cross-linking the mercapto-terminated polymers and the epoxide-terminated polymers having a percentage by weight of approximately 15 parts to 100 parts by weight of the epoxide-terminated polymers, the filler materials including phosphates and borates, the phosphates being selected from a group consisting of sodium and ammonium phosphate and the borates being selected from a group consisting of sodium and ammonium borate, the filler materials being uniformly disposed in the binder in about 10 to 80 parts by weight of at least one of sodium or ammonium phosphate per 100 parts by weight of binder and from about 25 to 80 parts by weight of at least sodium or ammonium borate per 100 parts by weight of the binder.

4. A thermally protective material capable of providing heat insulation by withstanding elevated temperatures as high as thousands of degrees Fahrenheit for extended periods of time as long as tens of hours without gross destruction, consisting essentially of:

a binder selected from a group consisting of mercapto-terminated polymers and epoxy-terminated polymers, the mercapto-terminated polymers and epoxy-terminated polymers being cross-linked, the mercapto-terminated polymers having the general formula HS(R—SS)$_n$RSH wherein R is a polyvalent organic radical containing at least one methylene group and n is an integer of from about 3 to 100, and preferably from about 3 to 25 and the epoxy-terminated polymers having the general formula

where R' is the divalent organic radical of a dihydric alcohol or a dihydric phenol and n usually has a value of less than 1 to a value of about 20, and a filler mixed with the binder and selected from a group consisting of sodium and ammonium borate and a group consisting of sodium and ammonium phosphate, a material selected from a group consisting of the aliphatic and aromatic primary, secondary and tertiary amines and having properties of serving as an agent for cross-linking the mercapto-terminated polymers and the epoxide-terminated polymers, the mercapto-terminated polymers having a range of 1 part to 9 parts by weight to 9 parts to 1 part by weight of epoxide-terminated polymers and the material selected for cross-linking having a range of 15 parts to 100 parts by weight of epoxide-terminated polymers and the filler materials being uniformly dispersed in the binder in about 10 to 80 parts by weight of at least one of sodium or ammonium phosphate per 100 parts by weight of binder and from about 25 to 80 by weight of at least one of sodium or ammonium borate per 100 parts by weight of binder.

* * * * *